(No Model.)

J. McFARLANE.
AUTOMATIC LOCKING HOOK.

No. 577,144. Patented Feb. 16, 1897.

Witnesses
Jas Edmunds
S. McBain

Inventor
James McFarlane
By P. J. Edmunds
Attorney

UNITED STATES PATENT OFFICE.

JAMES McFARLANE, OF LONDON, CANADA.

AUTOMATIC LOCKING-HOOK.

SPECIFICATION forming part of Letters Patent No. 577,144, dated February 16, 1897.

Application filed May 25, 1895. Serial No. 550,722. (No model.)

*To all whom it may concern:*

Be it known that I, JAMES MCFARLANE, a subject of the Queen of Great Britain, and a resident of London township, in the county of Middlesex, in the Province of Ontario, Canada, have invented a new and useful Automatic Locking-Hook, of which the following is a specification.

This invention relates to improvements on a device by which an object is caught or by which one object is engaged with another and its accidental disengagement therefrom avoided and completely prevented.

To this end my invention consists in the construction as hereinafter more fully described and claimed and as illustrated in the accompanying drawings, wherein—

Figure 2:
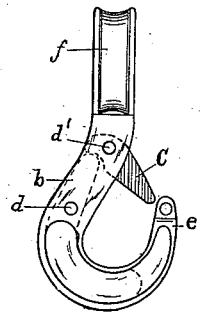
Figure 1:
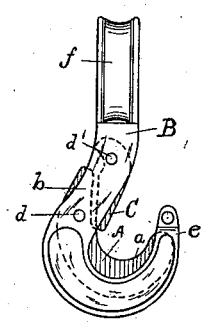
Figure 5:
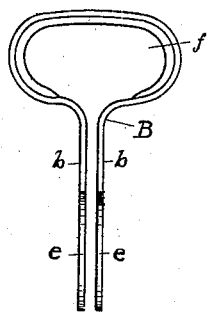
Figure 4:
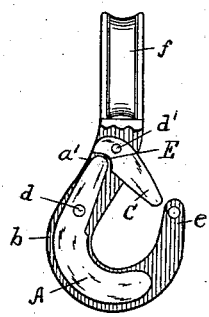
Figure 3:
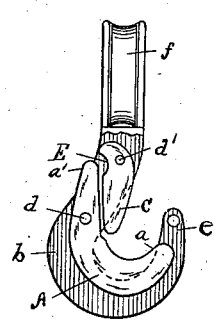
Figure 8:
Figure 7:
Figure 6:
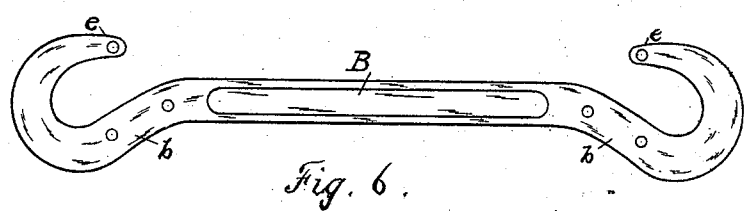

Figure 1 is a side view of the hook, showing the parts adjusted to permit its engagement with an object. Fig. 2 is another view of same, showing the adjustment of the parts after engagement with an object. Fig. 3 is another view of Fig. 1, showing one side removed. Fig. 4 is another view of Fig. 2, showing one side removed. Fig. 5 is a detail front view of the body of the hook. Fig. 6 is a detail plan view of the body of the hook before being bent longitudinally to the position shown in Fig. 5. Figs. 7 and 8 are detail side views of the latch-piece and locking-lever, respectively.

Referring to the said drawings, the letter B designates the hook, which is preferably constructed in the manner described below and comprises hook sides $b$ and ends $e$, about as shown in the drawings.

C is a latch having a cavity or notch on its under side near one end, and $d'$ is a pivot-pin passing through this latch nearly opposite said notch and connecting it with the hook at the upper end of its sides, or about at their point of junction with the shank of the hook, this construction producing a longer end of the latch, which is proportioned so that it may extend completely across and close the throat of the hook, as seen in Fig. 4, or may hang idly within the hook and leave the throat open, as seen in Fig. 3.

A is a locking-lever comprising a straight upper end $a'$ and a lower end $a$, which is curved to conform with the curvature of the hook sides $b$, and $d$ is a pivot-pin connecting this lever at a point about midway of its length with the back of the hook, as best seen in Fig. 4.

With this construction of parts the latch and lever stand normally as seen in Fig. 3, wherein the lower end $a$ of the latter is raised slightly above the upper edges of the hook sides $b$, so that a rope or ring passed into and borne downward within the hook will press upon such lower end of the lever before the ring comes in contact with the hook itself.

The body B (shown in Fig. 6) is bent longitudinally until it is in the form shown in Fig. 5. This brings the hooked ends $e$ together. The lever $a$ and latch-piece $c$ are then placed between the folded ends $b$ of this body, as shown in Fig. 4, and are pivotally supported between the folded ends $b$ of the body B on the pivot-pins $d$ $d'$, extending through said parts A and C and into and riveted or otherwise rigidly secured to the body B. This securely holds the ends $b$ of the body B together and prevents them from spreading; but these ends $b$ may be secured together to prevent them from spreading in any suitable manner or by any suitable means. This hook is engaged with an object and securely held from accidental disengagement as follows:

The hooked ends $e$ are hooked onto or are passed into the bit-ring. (Not shown.) This engages said hook $e$ with said ring; and the resting on or the pressure of the bit-ring on the curved end $a$ of the lever A, when the latter is in the position shown in Figs. 1 and 3, automatically adjusts said lever to and holds it in the position shown in Figs. 2 and 4. At the same time that the end $a$ of said lever A is moving to the position stated the other or upper end $a'$ of said lever, engaging with the latch-piece C below the pivot $d$, is also moved and automatically adjusts the latch-piece to the position shown in Fig. 4. When in this position, the latch-piece C closes the throat of the hook, as shown in Figs. 2 and 4, to securely engage said hook with said bit-ring; and while the latch-piece C is being adjusted to the position shown in Fig. 4 the upper end $a'$ of the locking-lever A is being automatically adjusted in the cavity or notch E of said latch-piece C.

It should be observed that the lower end $a$ of the lever is not borne farther downward than shown in Fig. 4, where its upper edge stands just beneath the upper edge of the hook side $b$, and hence the upper end $a'$ thereof will never be thrown farther forward than here shown. This avoids and completely prevents the accidental movement of the latch-piece, and thereby avoids and completely prevents the accidental disengagement of said hook from said bit-ring.

The hook may be readily removed from the bit-ring, however, by grasping it by the hand and applying pressure to the latch-piece C between its pivot $d'$ and the point of the hook $e$. This overcomes the pressure of the bit-ring on the end $a$ of the lever A and adjusts said latch-piece C and lever A to the position shown in Fig. 1, when said hook may be detached from said bit-ring.

This invention has been described in connection with the attachment of the driving or other rein to the bit-ring, for which its use is particularly advantageous on account of the quickness of the operation and its security, but this device may be used to advantage in connection with various parts of the harness of a draft or other animal or for other purposes.

Having thus described my invention, I claim—

In a hook, the combination with the body, and a latch pivoted thereto; of an independent member connected with the body by a separate pivot, this member standing within the bend of the hook, and connections between said member and latch for automatically throwing the latter upward to a position across the throat of the hook when pressure is applied to the lower end of the member, substantially as set forth.

In testimony whereof I have signed in the presence of the two undersigned witnesses.

JAMES McFARLANE.

Witnesses:
P. J. EDMUNDS,
S. McBAIN.